(12) United States Patent
Trenholm et al.

(10) Patent No.: US 10,982,947 B2
(45) Date of Patent: Apr. 20, 2021

(54) SYSTEM AND METHOD OF SURFACE INSPECTION OF AN OBJECT USING MULITPLEXED OPTICAL COHERENCE TOMOGRAPHY

(71) Applicant: SIGHTLINE INNOVATION INC., Toronto (CA)

(72) Inventors: Wallace Trenholm, Toronto (CA); Lorenzo Pons, Toronto (CA)

(73) Assignee: Sightline Innovation Inc., Toronto (CA)

( * ) Notice: Subject to any disclaimer, the term of this patent is extended or adjusted under 35 U.S.C. 154(b) by 0 days.

(21) Appl. No.: 16/006,039

(22) Filed: Jun. 12, 2018

(65) Prior Publication Data

US 2019/0137253 A1  May 9, 2019

Related U.S. Application Data

(60) Provisional application No. 62/518,249, filed on Jun. 12, 2017.

(51) Int. Cl.
*G01B 9/02* (2006.01)
*G01B 11/24* (2006.01)
*G01B 11/14* (2006.01)

(52) U.S. Cl.
CPC ..... *G01B 9/02028* (2013.01); *G01B 9/02035* (2013.01); *G01B 9/02091* (2013.01); *G01B 11/14* (2013.01); *G01B 11/2441* (2013.01)

(58) Field of Classification Search
CPC ............... G01B 11/14; G01B 11/2441; G01B 9/02035; G01B 9/02028; G01B 9/02091; G01B 9/02017
See application file for complete search history.

(56) References Cited

U.S. PATENT DOCUMENTS

| 7,945,312 B2* | 5/2011 | Hular | A61B 5/0066 600/476 |
| 2005/0018200 A1* | 1/2005 | Guillermo | G01N 21/4795 356/479 |
| 2007/0278389 A1* | 12/2007 | Ajgaonkar | G01B 9/02028 250/221 |
| 2012/0287401 A1* | 11/2012 | Bizios | A61B 3/0025 351/206 |
| 2014/0078510 A1* | 3/2014 | Rubio Guivernau | G01B 9/02091 356/479 |
| 2014/0160488 A1* | 6/2014 | Zhou | G01B 9/02004 356/479 |
| 2015/0124261 A1* | 5/2015 | Jaillon | G01B 9/02091 356/479 |
| 2017/0276471 A1* | 9/2017 | Jiang | G01B 9/02028 |

(Continued)

*Primary Examiner* — Michael P LaPage
(74) *Attorney, Agent, or Firm* — Own Innovation; James W. Hinton

(57) ABSTRACT

A system and method for surface inspection of an object using multiplexed optical coherence tomography (OCT) is provided. The method includes moving the object relative to two or more scanner heads along a direction of travel; alternatingly directing a sample beam to each of the two or more scanner heads; and when the sample beam is directed at each respective scanner head, scanning comprising: steering the sample beam from the respective scanner head to an unscanned region on the surface of the object; and performing an A-scan of the object.

7 Claims, 14 Drawing Sheets

(56) References Cited

U.S. PATENT DOCUMENTS

2017/0357879 A1* 12/2017 Odaibo ................. G06K 9/627
2018/0012359 A1*  1/2018 Prentasic ............. G06T 7/0012
2018/0260951 A1*  9/2018 Yang ................. G06K 9/00718
2019/0056214 A1*  2/2019 Everett ............. G01B 9/02017

* cited by examiner

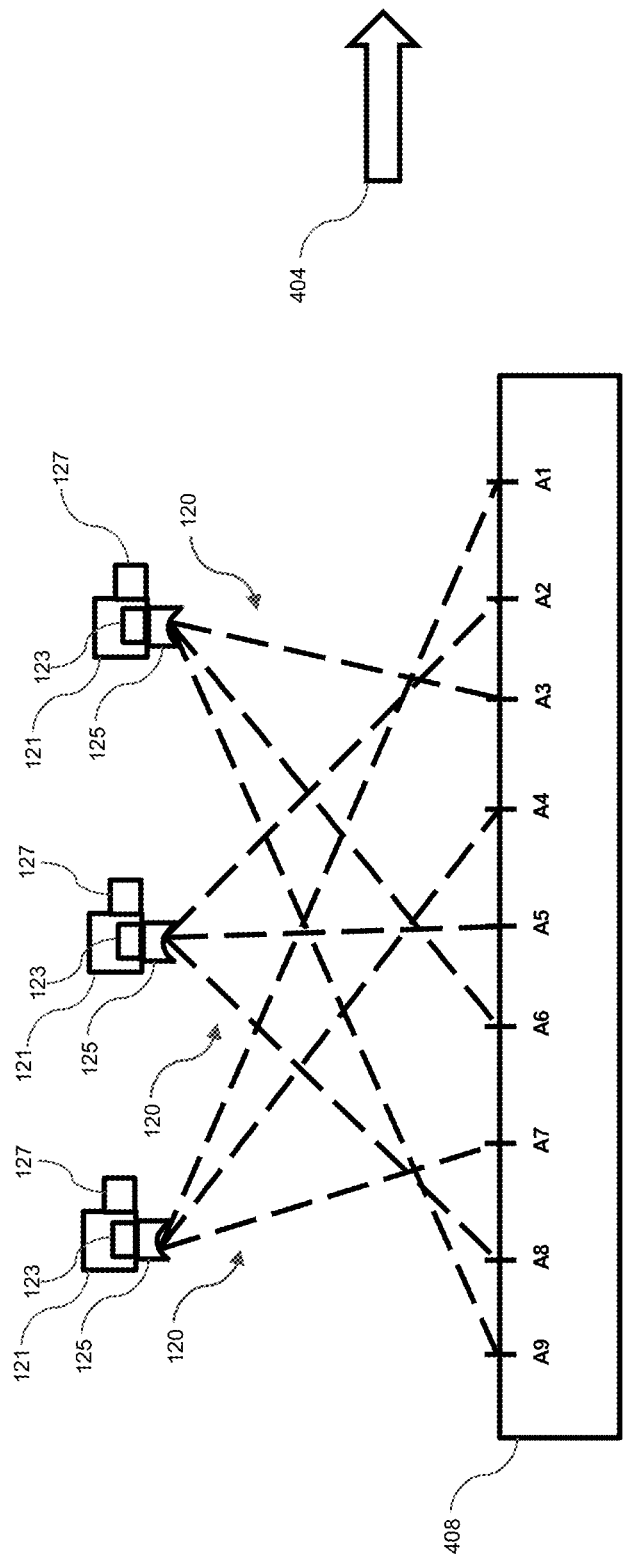

SYSTEM AND METHOD OF SURFACE INSPECTION OF AN OBJECT USING MULITPLEXED OPTICAL COHERENCE TOMOGRAPHY

TECHNICAL FIELD

The following relates generally to imaging and more specifically to a system and method for multiplexed optical coherence tomography.

BACKGROUND

In many applications, imaging can be used to garner information about a particular object; particularly aspects about its surface or subsurface. One such imaging technique is tomography. A device practicing tomography images an object by sections or sectioning, through the use of a penetrating wave. Conventionally, tomography can be used for various applications; for example, radiology, biology, materials science, manufacturing, quality assurance, quality control, or the like. Some types of tomography include, for example, optical coherence tomography, x-ray tomography, positron emission tomography, optical projection tomography, or the like.

Conventionally, the above types of tomography, and especially optical coherence tomography, produce detailed imaging of an object; however, inaccuracies and problems can arise with respect to properly imaging the object.

SUMMARY

In an aspect, there is provided a method of surface inspection of an object using multiplexed optical coherence tomography (OCT), the method comprising: moving the object relative to two or more scanner heads along a direction of travel; alternatingly directing a sample beam to each of the two or more scanner heads; and when the sample beam is directed at each respective scanner head, scanning comprising: steering the sample beam from the respective scanner head to an unscanned region on the surface of the object; and performing an A-scan of the object.

In a particular case, the sample beam is steered at a first unscanned region or an unscanned region adjacent to a most-recently scanned region along a direction opposite the direction of travel.

In another case, when the sample beam is directed at each respective scanner head, the scanning further comprising: steering the sample beam from the respective scanner head to an adjacent unscanned region adjacent to the most-recently scanned region along a direction opposite the direction of travel; and performing an A-scan of the object.

In yet another case, when the sample beam is directed at each respective scanner head, the scanning further comprising: determining whether the surface of the unscanned region is in focus; and where the surface of the unscanned region is not in focus, adjusting an optical path in the OCT such that the surface of the unscanned region is in focus.

In yet another case, determining whether the surface of the unscanned region is in focus comprises measuring a distance between the respective scanner head and the surface of the object at the unscanned region to determine whether the surface is within a focal length of the OCT with the respective scanner head.

In yet another case, the method further comprising retrieving a surface geometry of the object, wherein determining whether the surface of the unscanned region is in focus comprises determining whether the surface is within a focal length of the OCT with the respective scanner head using the surface geometry of the object to determine a distance between the respective scanner head and the surface.

In yet another case, when the sample beam is directed at each respective scanner head, the scanning further comprising: determining whether a difference between a reference path of the OCT and a sample path of the OCT at the unscanned region are within a coherence length; and where the difference is not within the coherence length, adjusting an optical path in the OCT such that the difference is within the coherence length.

In yet another case, successively scanned regions are non-adjacent.

In another aspect, there is provided a system for surface inspection of an object using an optical coherence tomography (OCT) system, the OCT system comprising an optical source to produce an optical beam, a beam splitter to direct a first derivative of the optical beam to a reflective element and a second derivative of the optical beam to the object via two or more scanner heads and direct the optical beams returned from the reflective element and the object to a detector for detection of an interference effect, the system for surface inspection comprising: an object translator to move the object relative to the two or more scanner heads along a direction of travel; a multiplexing module to use a multiport selector to alternatingly direct a sample beam to each of the two or more scanner heads, the sample beam comprising the second derivative of the optical beam; and a steering module to, when the sample beam is directed at each respective scanner head, use a beam steering device at the respective scanner head to steer the sample beam from the respective scanner head to an unscanned region on the surface of the object, the OCT system scanning at the unscanned region by performing and outputting an A-scan of the object.

In a particular case, the steering module steers the sample beam at a first unscanned region or an unscanned region adjacent to a most-recently scanned region along a direction opposite the direction of travel.

In another case, when the sample beam is directed at each respective scanner head, the steering module steers the sample beam from the respective scanner head to an adjacent unscanned region adjacent to the most-recently scanned region along a direction opposite the direction of travel, the OCT system scanning at the adjacent unscanned region by performing and outputting an A-scan of the object.

In yet another case, the system further comprising a distance module to, when the sample beam is directed at each respective scanner head, determine whether the surface of the unscanned region is in focus and, where the surface of the unscanned region is not in focus, adjust an optical path in the OCT with an optical delay line or a focal-length adjusting mechanism such that the surface of the unscanned region is in focus.

In yet another case, each respective scanner head has a separate optical delay line or focal-length adjusting mechanism.

In yet another case, the system further comprising a distance determination module to measure a distance between the respective scanner head and the surface of the object at the unscanned region such that the distance module can determine whether the surface is within a focal length of the OCT with the respective scanner head.

In yet another case, the system further comprising a distance determination module to retrieve a surface geometry of the object such that the distance module can determine whether the surface is within a focal length of the OCT with the respective scanner head using the surface geometry of the object to determine a distance between the respective scanner head and the surface.

In yet another case, the system further comprising a distance module to, when the sample beam is directed at each respective scanner head, determine whether a difference between a reference path of the OCT and a sample path of the OCT at the unscanned region are within a coherence length, and where the difference is not within the coherence length, adjust an optical path in the OCT with an optical delay line or a focal-length adjusting mechanism such that the difference is within the coherence length.

In yet another case, each respective scanner head has a separate optical delay line or focal-length adjusting mechanism.

In yet another case, successively scanned regions are non-adjacent.

In yet another case, the multiport selector comprises a resonator mirror.

In yet another case, the multiport selector comprises a rotatable polygon mirror.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 6 is a diagrammatic side view of a scanner head and object, according to another embodiment of the system of FIG. 1;

DETAILED DESCRIPTION

Figure 1:
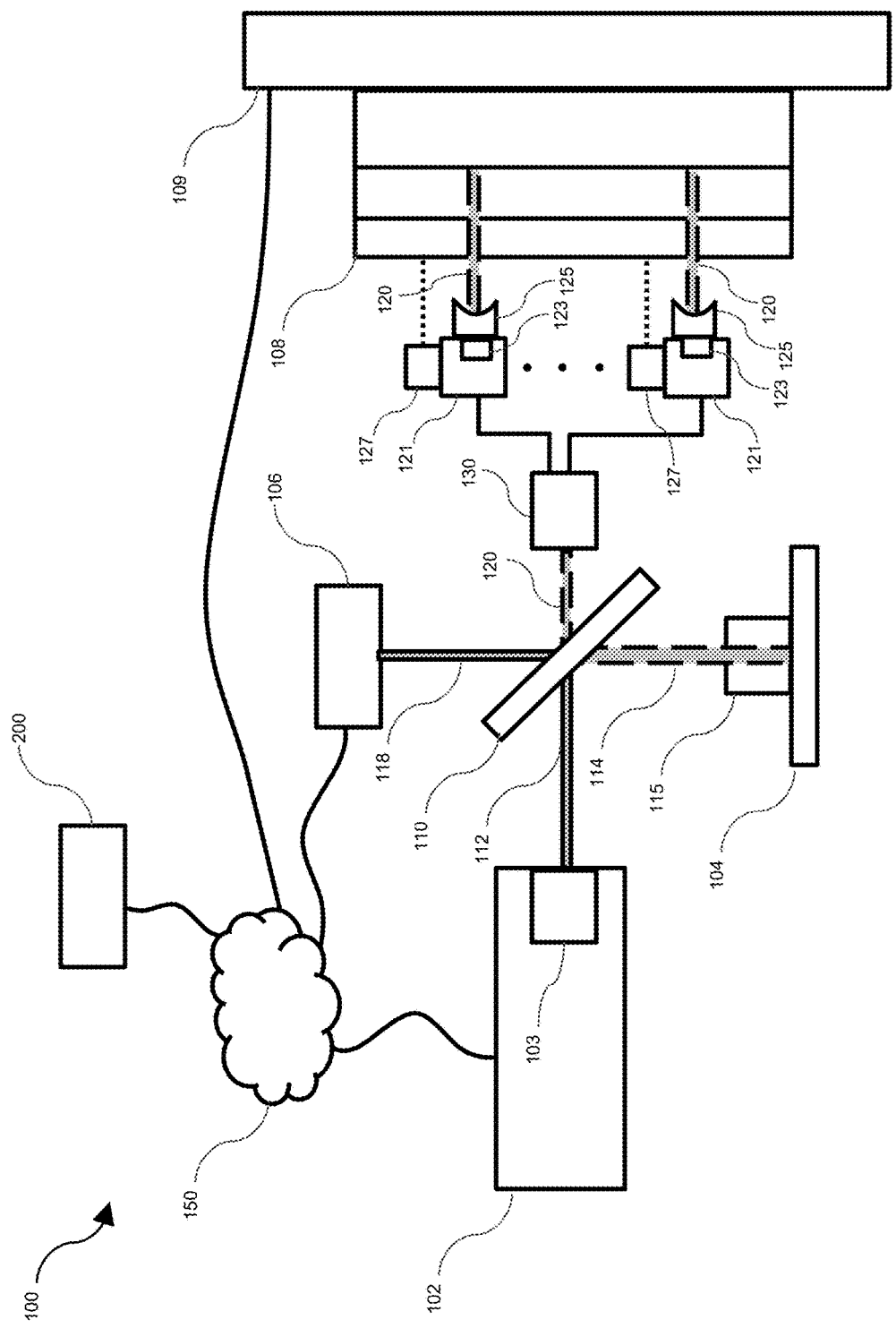
FIG. 1 is schematic diagram of a multiplexed optical coherence tomography (OCT) system, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to imaging and more specifically to a system and method for multiplexed optical coherence tomography.

Optical coherence tomography (OCT), and particularly non-destructive OCT, is a technique for imaging in two or three-dimensions. OCT can provide a relatively high resolution, potentially up to few micrometers, and can have relatively deep penetration, potentially up to a few millimeters, in a scattering media.

OCT techniques can use back-scattered light from an object to generate information about that object; for example, generating a three-dimensional representation of that object when different regions of the object are imaged.

FIG. 1 illustrates a schematic diagram of a multiplexed OCT system 100, according to an embodiment. The OCT system 100 includes an optical source (or photonic emitter) 102, a reflective element 104 (for example, a mirror), a beam splitter 110, and a detector (for example, a photodetector) 106. For exemplary purposes, the diagram shows an object 108 with three layers of depth. The optical source 102 produces an originating optical beam (or path) 112 that is directed towards the beam splitter 110. The beam splitter 110 divides the originating beam 112 and directs one derivative beam, referred to as the reference beam (or path) 114, towards the reflective element 104 and another derivative beam, referred to herein as the sample beam (or path) 120, towards the object to be scanned 108. Both derivative beams 114, 120 are directed back to the beam splitter 110, and then directed as a resultant beam 118 to the detector 106.

In the present embodiment, the system 100 includes an optical delay line 115 in the reference path 114. The optical delay line 115 can be used to adjust the length of the optical path along the reference path. Particularly, the optical delay line 115 can be used to match the distance of the sample path 120 to enable low-coherence interferometry. The optical delay line 115 can include, for example, a collimation lens directed at a mirror 104 on a linear actuator; whereby linear actuation of the mirror 104 in the axial direction adjusts the length of the reference path 114.

In the present embodiment, the system 100 includes two or more scanner heads 121 in the sample path 120. Each of the scanner heads 121 directs the sample beam 120 onto the object 108 when that respective scanner head 121 receives the sample beam 120. The system 100 also includes a multiport selector 130 in the sample path 120 in between the beam splitter 110 and the two or more scanner heads 121. As described herein, the multiport selector 130 determines which of the two or more scanner heads 121 receives the sample optical beam 120 by selecting the path of the sample beam 120. The multiport selector 130 can direct the sample beam to each of the two or more scanner heads 121 over time.

In some cases, each of the scanner heads 121 can include a beam steering device 125 to direct light to the object 108. The beam steering device 125 may be, for example, a mirror galvanometer in one or two dimensions, a single axis scanner, a microelectromechanical system (MEMs)-based scanning mechanism, a rotating scanner, or other suitable mechanism for beam steering. The beam steering device 125 may be controlled electromechanically.

In some embodiments, the scanner head 121 can also include a focal-length adjusting mechanism 123 to adjust the focal length of the sample beam 120. In some cases, the focal-length adjusting mechanism 123 can be, for example, a focus-tunable lens. In a particular example, the focus-tunable lens can be a liquid lens. With liquid lenses, each lens is filled with an optical liquid. When a user or system applies a voltage, the change in voltage alters the pressure profile of the liquid, resulting in a change in radius of curvature to each lens. This change in radius causes the lens to change the effective focal length of the sample beam 120, for example, in the range of +15 to +120 mm using an aperture of 10 mm. In further cases, the focal-length adjusting mechanism 123 can be two or more lenses that are mechanically translated relative to each other, thereby changing the effective focal length of the sample beam 120.

In some cases, the OCT system 100 can include a distance determination module 127 for determining the distance between the scanner head and the object 108. In an example, the distance determination module 127 can be an infrared line scanner, laser rangefinder, 3D laser scanner, radar based rangefinder, or the like. In some cases, the distance determination module 127 may be associated with, or separate from, the scanner head 121.

In some cases, the system 100 can include an amplification mechanism; for example, a doped fiber amplifier, a semiconductor amplifier, a Raman amplifier, a parametric amplifier, or the like. The amplification mechanism can be used to amplify the signal of the optical source 102 and/or to increase quantity of photons backscattered off the surface under inspection and collected on the detector 106. By using the amplification mechanism, sensitivity of the system 100 may be increased.

In some cases, the system 100 can include an object translator 109 to move the object relative to the fixed sample beam 120 and/or the fixed scanner head 121. The object translator 109 can be, for example, a conveyor system, a robotic system, or the like. The illustration of FIG. 1 is only diagrammatic as the optical paths can be comprised of optical cables, and as such, the system components can have any number of physical placements and arrangements.

The optical source 102 can be any light source suitable for use with an interferometric imaging modality; for example, a laser or light emitting diode (LED). Particularly, in some implementations, the optical source 102 can be a tunable laser the wavelength of which can be altered (i.e. swept) in a controlled manner; for example, to sweep a wide wavelength range (e.g. 110 nm) at high speed (e.g. 20 KHz). In a particular example, the tunable laser can have a centre wavelength of 1310 nm, wherein the wavelength of the emitted light is continuously scanned over a 110 nm range, with a scan rate of 20 kHz and a coherence length of over 10 mm. In a further embodiment, the optical source 102 may be a low coherence light source such as white light or an LED. As an example, using a low coherence light source can facilitate extraction of spectral information from the imaging data by distributing different optical frequencies onto a detector array (e.g. line array CCD) via a dispersive element, such as a prism, grating, or other suitable device. This can occur in a single exposure as information of the full depth scan can be acquired.

In some cases, the optical source 102 can include a collimator 103 for narrowing the originating beam 112. In further cases, further optics may be included in various stages of the system 100 to control or change the optical beams. Optics may include lenses or other optical devices suitable to control, guide, navigate, position, or the like, the light beam in a desired manner; as an example, an F-theta or telecentric lens may be included. Where an F-theta or telecentric lens is used, the planification means that the focal-length adjusting mechanism 123 only has to compensate in the axial direction, along the z-axis of the optical beam.

In further cases, software techniques may be employed for correcting or affecting optical errors or signals.

The detector 106 can be any suitable photodetector. In a particular case, the detector 106 can be a balanced photodetector, which can have an increased signal to noise ratio. In further cases, the detector 106 may be a photoelectric-type photodetector, such as a charge-coupled device (CCD) or complementary metal-oxide semiconductor (CMOS). The detector 106 may operate by photoemission, photovoltaic, thermal, photochemical, or polarization mechanism, or other mechanism through which electromagnetic energy can be converted into an electrical signal. Upon receiving the resultant beam 118, the detector 106 can convert the radiance/intensity of the resultant beam 118 into an electrical signal. In some cases, the electrical signal may then be converted to a digital signal, and modified by signal conditioning techniques such as filtering and amplification. In some cases, the interference pattern corresponding to the backscattered light can be converted into a signal by the detector 106 via, for example, a high-speed digitizer.

The multiport selector 130 can be any suitable selective beam steering device. As an example, the multiport selector 130 can be a resonator mirror that selects an output line for the beam based on changes in resonation. In another example, the multiport selector 130 can be a rotatable polygon mirror that directs the sample beam to different output lines (connected to different scanner heads 121) as the polygon mirror rotates. The steering module 290 can select which scanner head 121 is to receive the sample beam (as described below) based on changes to the resonance of the resonator mirror or controlling of the rotation of the polygon mirror. In this way, resonance changes or rotation speed can be synchronized with the time between the performance of A-scans by the system 100 (as described below).

The OCT system 100 also includes a computing module 200. The computing module 200 may be locally communicatively linked or remotely communicatively linked, for example via a network 150, to one or more other elements of the system 100; for example, to the optical source 102, the detector 106, the object translator 109, each of the scanner heads 121, the focal-length adjusting mechanism 123, the beam steering device 125, the distance determination module 127, the optical delay line 115, and the multiport selector 130. The computing module 200 may be used for processing and analysis of imaging data provided by the OCT system 100. In some cases, the computing module 200 may operate as a control system or controller, and in other cases, may be connected to a separate control system or controller. Further, the computing module 200 may host a user-accessible platform for invoking services, such as reporting and analysis services, and for providing computational resources to effect machine learning techniques on the imaging data.

Figure 2:
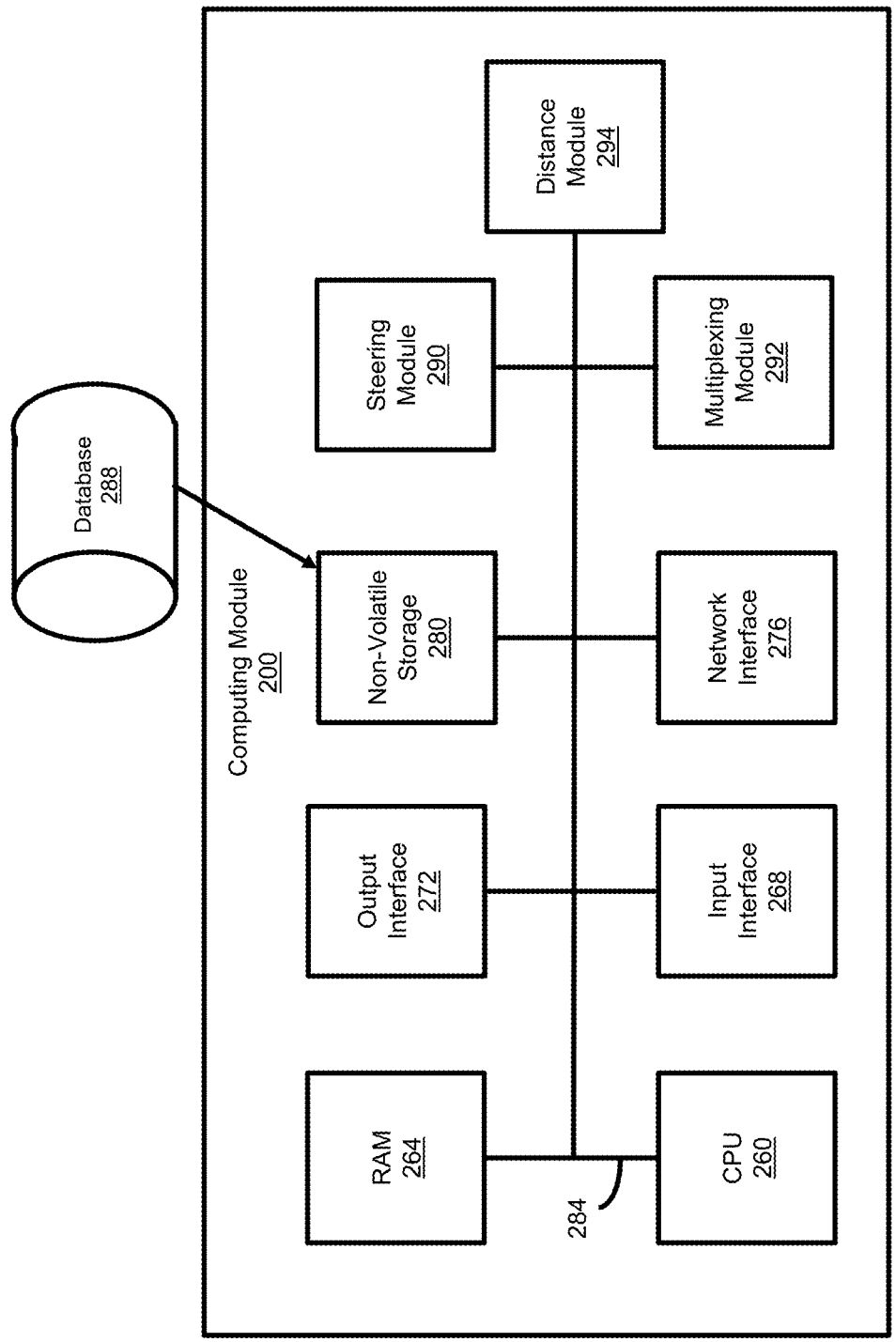
FIG. 2 is a schematic diagram for a computing module, according to the system of FIG. 1.

In an embodiment, as shown in FIG. 2, the computing module 200 can include a number of physical and logical components, including a central processing unit ("CPU") 260, random access memory ("RAM") 264, an input interface 268, an output interface 272, a network interface 276, non-volatile storage 280, and a local bus 284 enabling CPU 260 to communicate with the other components. CPU 260 can include one or more processors. RAM 264 provides relatively responsive volatile storage to CPU 260. The input interface 268 enables an administrator to provide input via, for example, a keyboard and mouse. The output interface 272 outputs information to output devices, for example, a display or speakers. The network interface 276 permits communication with other systems or computing devices. Non-volatile storage 280 stores the operating system and programs, including computer-executable instructions for implementing the OCT system 100 or analyzing data from the OCT system 100, as well as any derivative or related data. In some cases, this data can be stored in a database 288. During operation of the system 200, the operating system, the programs and the data may be retrieved from the non-volatile storage 280 and placed in RAM 264 to facilitate execution. In an embodiment, the CPU 260 can be configured to execute various modules, for example, a steering module 290, a multiplexing module 292, and a distance module 294.

In an embodiment, the system 100 can use machine learning (ML) to transform raw data from the A-scan, B-scan, or C-scan into a descriptor. The descriptor is information associated with a particular defect in the object. The descriptor can then be used to determine a classifier for the defect. As an example, the CPU 260 can do this detection and classification with auto-encoders as part of a deep belief network.

OCT systems 100 generally use different localization techniques to obtain information in the axial direction, along the axis of the originating optical beam 112 (z-axis), and obtain information in the transverse direction, along a plane perpendicular to the axis of the originating beam 112 (x-y axes). Information gained from the axial direction can be determined by estimating the time delay of the optical beam reflected from structures or layers associated with the object 108. OCT systems 100 can indirectly measure the time delay of the optical beam using low-coherence interferometry.

Typically OCT systems that employ low-coherence interferometers can use an optical source 102 that produces an optical beam 112 with a broad optical bandwidth. The originating optical beam 112 coming out of the source 102 can be split by the beam splitter 110 into two derivative beams (or paths). The first derivative beam 114 can be referred to as the reference beam (or path or arm) and the second derivative beam 120 can be referred to as the sample beam (or path or arm) of the interferometer. Each derivative beam 114, 120 is reflected back and combined at the detector 106.

The detector 106 can detect an interference effect (fast modulations in intensity) if the time travelled by each derivative beam in the reference arm and sample arm are approximately equal; whereby "equal" generally means a difference of less than a 'coherence length.' Thus, the presence of interference serves as a relative measure of distance travelled by light on the sample arm.

For OCT, the reference arm can be scanned in a controlled manner, and the reference beam 114 can be recorded at the detector 106. An interference pattern can be detected when the mirror 104 is nearly equidistant to one of the reflecting structures or layers associated with the object 108. The detected distance between two locations where the interference occurs corresponds to the optical distance between two reflecting structures or layers of the object in the path of the beam. Advantageously, even though the optical beam can pass through different structures or layers in the object, OCT can be used to separate out the amount of reflections from individual structures or layers in the path of the optical beam.

With respect to obtaining information in the transverse direction, as described below, the sample beam 120 can be focused on a small area of the object 108, potentially on the order of a few microns, and successively scanned over a region of the object 108.

In an embodiment of an OCT system, Fourier-domain can be used as a potentially efficient approach for implementation of low-coherence interferometry. Instead of recording intensity at different locations of the reference reflective element 104, intensity can be detected as a function of wavelengths or frequencies of the optical beam 112. In this case, intensity modulations, as a function of frequency, are referred to as spectral interference. Whereby, a rate of variation of intensity over different frequencies can be indicative of a location of the different reflecting structures or layers associated with the object. A Fourier transform of spectral interference information can then be used to provide information similar to information obtained from scanning of the optical beam.

In an embodiment of an OCT system, spectral interference can be obtained using either, or both, of spectral-domain techniques and swept-source techniques. With the spectral-domain technique, the optical beam can be split into different wavelengths and detected by the detector 106 using spectrometry. In the swept-source technique, the optical beam produced by the optical source 102 can sweep through a range of optical wavelengths, with a temporal output of the detector 106 being converted to spectral interference.

Advantageously, employing Fourier-domain can allow for faster imaging because back reflections from the object can be measured simultaneously.

The resolution of the axial and transverse information can be considered independent. Axial resolution is generally related to the bandwidth, or the coherence-length, of the originating beam 112. In the case of a Gaussian spectrum, the axial resolution ($\Delta z$) can be: $\Delta z = 0.44 * \lambda_0^2 / \Delta \lambda$, where $\Delta \lambda_0$ is the central wavelength of the optical beam and $\Delta \lambda$ is the bandwidth defined as full-width-half-maximum of the originating beam. In other cases, for spectrum of arbitrary shape, the axial spread function can be estimated as required.

In some cases, the depth of the topography imaging for an OCT system is typically limited by the depth of penetration of the optical beam into the object 108, and in some cases, by the finite number of pixels and optical resolution of the spectrometer associated with the detector 106. Generally, total length or maximum imaging depth $z_{max}$ is determined by the full spectral bandwidth $\lambda_{full}$ of the spectrometer and is expressed by $z_{max} = (\frac{1}{4}N) * (\lambda_0^2 / \lambda_{full})$ where N is the total number of pixels of the spectrometer.

With OCT systems, sensitivity is generally dependent on the distance, and thus delay, of reflection. Sensitivity is generally related to depth by: $R(z) = \sin(p*z)/(p*z) * \exp(-z^2/(w*p))$. Where w depends on the optical resolution of spectrometer associated with the detector 106. The first term related to the finite pixels in the spectrometer and the second term related to the finite optical resolution of the spectrometer.

When implementing the OCT system 100, reflected sample and reference optical beams that are outside of the coherence length will theoretically not interfere. This reflectivity profile, called an A-scan, contains information about the spatial dimensions, layers and location of structures within the object 108 of varying axial-depths; where the 'axial' direction is along the axis of the optical beam path. A cross-sectional tomograph, called a B-scan, may be achieved by laterally combining a series of adjacent A-scans along an axis orthogonal to the axial direction. A B-scan can be considered a slice of the volume being imaged. One can then further combine a series of adjacent B-scans to form a volume which is called a C-scan. Once an imaging volume has been so composed, a tomograph, or slice, can be computed along any arbitrary plane in the volume.

A-scans represent an intensity profile of the object, and its values (or profile) characterize reflectance of the way the optical beam penetrates the surface of the object. Thus, such scans can be used to characterize the material from the surface of the object to some depth, at an approximately single region of the object 108. As used in the present disclosure, the term 'surface', of an object, is understood to include the peripheral surface down to the depth of penetration of the A-scan. B-scans can be used to provide material characterization from the surface of the object 108 to some depth, across a contour on the surface of the object 108.

The system 100, as described herein, can be used to detect features associated with the surface and subsurface of an object; and in some cases, for later categorization of such features. In a particular case, such features are defects in the object, due to, for example, various manufacturing-related errors or conditions.

Figure 4:
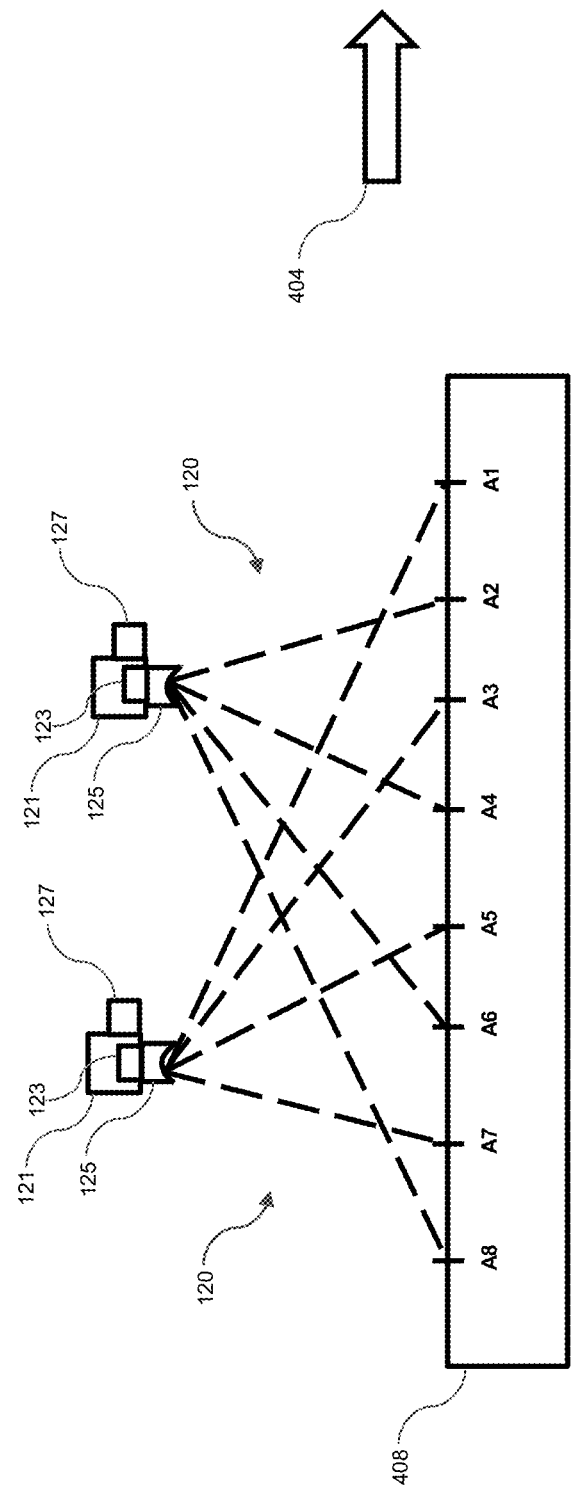
FIG. 4 is a diagrammatic side view of a scanner head and object, according to an embodiment of the system of FIG. 1.

In the present embodiments, as illustrated in the examples of FIGS. 4 and 6, the system 100 can advantageously use time-domain OCT multiplexing to perform multiple A-scans of an object 408 as the object 408 is moved in direction 404 relative to the two or more fixed scanner heads 121.

Figure 3:
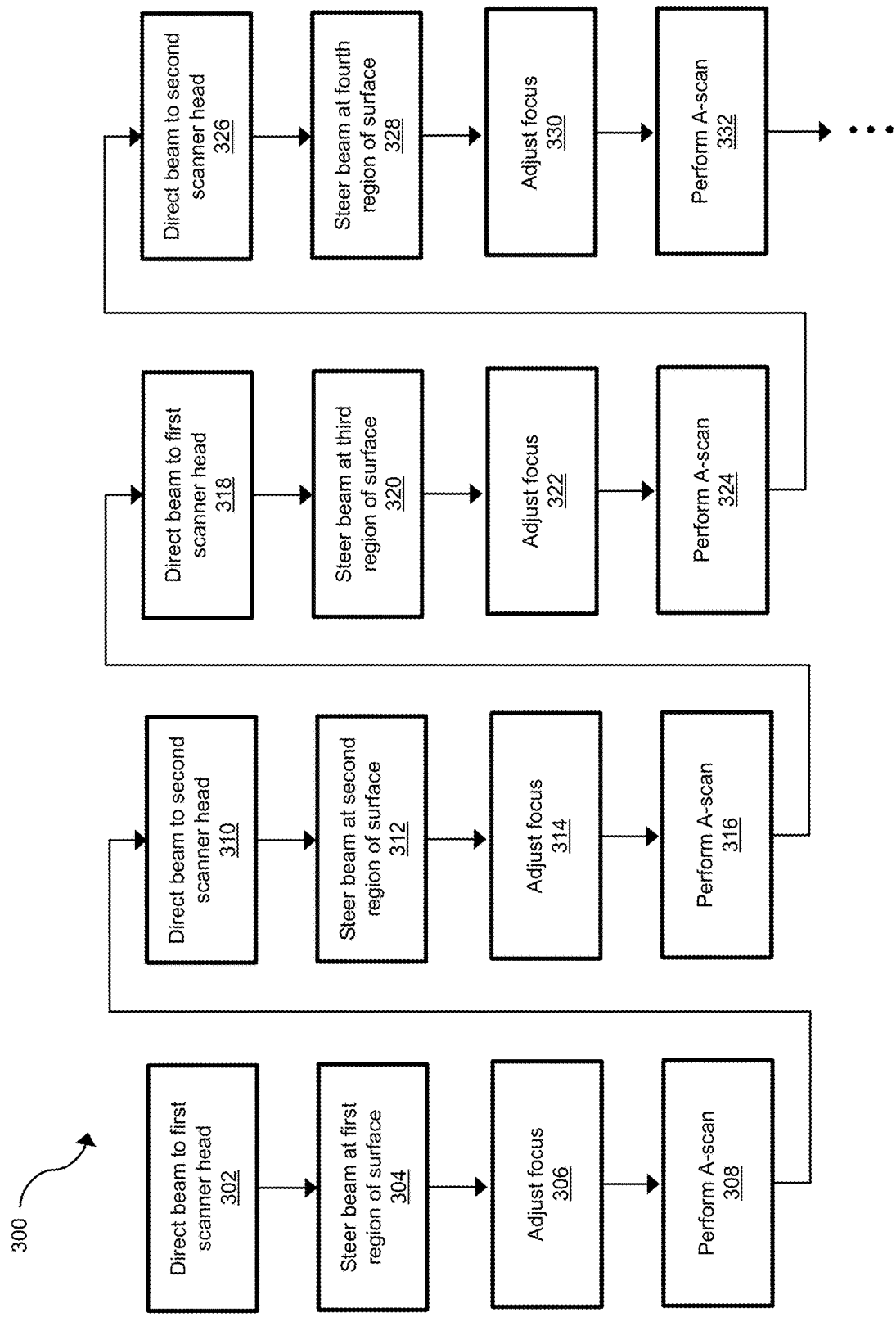
FIG. 3 is a flowchart for a method for surface inspection of an object using multiplexed optical coherence tomography (OCT), according to an embodiment.

Referring now to FIG. 3, shown therein is a method 300 of surface inspection using the multiplexed OCT system 100, in accordance with an embodiment. As exemplified in FIG. 4, in this case the system 100 includes two scanner heads 121. The method 300 may be used for inspecting the surface of an object 408 when the object 408 is moved relative to the scanner heads 121 along a direction of movement 404. In an exemplary case, the method 300 can be for the purposes of detecting surface defects or irregularities.

At block 302, the multiplexing module 292 directs the multiport selector 130 to direct the sample beam 120 to a first of the beam steering devices 125 associated with a first of the scanner heads 121.

At block 304, the steering module 290 directs the first of the beam steering devices 125 to steer the sample beam 120 at a first unscanned region (identified in FIG. 4 as 'A1') on the surface of the object 408.

At block 306, the distance module 294 adjusts the optical delay line 115 or the focal-length adjusting mechanism 123, or both, to keep the first region of the surface in focus and keep the reference path and sample path approximately equal in length within the tolerance of the coherence length. Where in focus is understood to mean having the surface within a present focal length of the system 100.

At block 308, the system 100 performs an A-scan of the object 408.

At block 310, the multiplexing module 292 directs the multiport selector 130 to direct the sample beam 120 to a second of the beam steering devices 125 associated with a second of the scanner heads 121.

At block 312, the steering module 290 directs the second of the beam steering devices 125 to steer the sample beam 120 at a second unscanned region (identified in FIG. 4 as 'A2') on the surface of the object 408.

At block 314, the distance module 294 adjusts the optical delay line 115 or the focal-length adjusting mechanism 123, or both, to keep the second region of the surface in focus and keep the reference path and sample path approximately equal in length within the tolerance of the coherence length.

At block 316, the system 100 performs an A-scan of the object 408.

At block 318, the multiplexing module 292 directs the multiport selector 130 to direct the sample beam 120 to the first of the beam steering devices 125.

At block 320, the steering module 290 directs the first of the beam steering devices 125 to steer the sample beam 120 at a third unscanned region (identified in FIG. 4 as 'A3') on the surface of the object 408.

At block 322, the distance module 294 adjusts the optical delay line 115 or the focal-length adjusting mechanism 123, or both, to keep the third region of the surface in focus and keep the reference path and sample path approximately equal in length within the tolerance of the coherence length.

At block 324, the system 100 performs an A-scan of the object 408.

At block 326, the multiplexing module 292 directs the multiport selector 130 to direct the sample beam 120 to the second of the beam steering devices 125.

At block 328, the steering module 290 directs the second of the beam steering devices 125 to steer the sample beam 120 at a fourth unscanned region (identified in FIG. 4 as 'A4') on the surface of the object 408.

At block 330, the distance module 294 adjusts the optical delay line 115 or the focal-length adjusting mechanism 123, or both, to keep the fourth region of the surface in focus and keep the reference path and sample path approximately equal in length within the tolerance of the coherence length.

At block 332, the system 100 performs an A-scan of the object 408.

The system 100 alternates using the scanner heads 121 by consecutively repeating taking A-scans with the first of the scanner heads 121 and then with the second of the scanner heads 121 at successive unscanned regions on the surface of the object 408. Whereby prior to each A-scan, the multiplexing module 292 directs the multiport selector 130 to direct the sample beam 120 to the respective one of the scanner heads 121, the steering module 290 directs the respective one of the beam steering devices 125 to steer the sample beam 120 at a respective region of the object 408, and the optical delay line 115 or the focal-length adjusting mechanism 123 are adjusted as necessary.

In some cases, the optical delay line 115 or the focal-length adjusting mechanism 123, or both, may not be required to be adjusted at all, or not adjusted during certain iterations, when the respective region is already in focus and the difference between the reference path 114 and sample path 120 are within the coherence length. In further cases, the object 408 can have a curved or modulating surface which will require associated adjustments in the focal length in order to keep the surface in focus.

Figure 5:
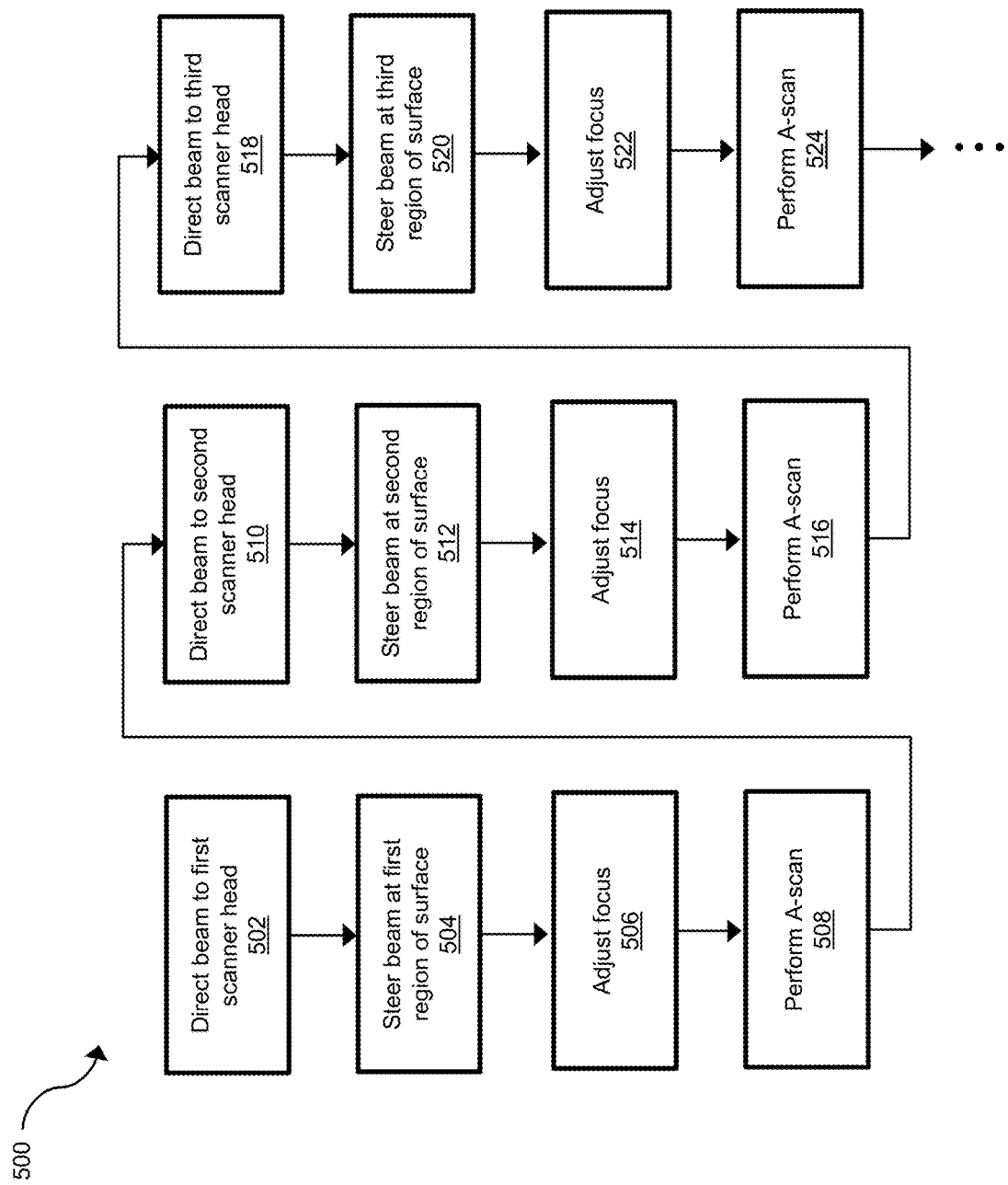
FIG. 5 is a flowchart for a method for surface inspection of an object using multiplexed optical coherence tomography (OCT), according to another embodiment.

Referring now to FIG. 5, shown therein is a method 500 of surface inspection using the multiplexed OCT system 100, in accordance with an embodiment. As exemplified in FIG. 6, in this case the system 100 includes three scanner heads 121. The method 500 may be used for inspecting the surface of an object 408 when the object 408 is moved relative to the scanner head 121 along a direction of movement 404. In an exemplary case, the method 500 can be for the purposes of detecting surface defects or irregularities.

At block 502, the multiplexing module 292 directs the multiport selector 130 to direct the sample beam 120 to a first of the beam steering devices 125 associated with a first of the scanner heads 121.

At block 504, the steering module 290 directs the first of the beam steering devices 125 to steer the sample beam 120 at a first unscanned region (identified in FIG. 6 as 'A1') on the surface of the object 408.

At block 506, the distance module 294 adjusts the optical delay line 115 or the focal-length adjusting mechanism 123, or both, to keep the first region of the surface in focus and keep the reference path and sample path approximately equal in length within the tolerance of the coherence length.

At block 508, the system 100 performs an A-scan of the object 408.

At block 510, the multiplexing module 292 directs the multiport selector 130 to direct the sample beam 120 to a second of the beam steering devices 125 associated with a second of the scanner heads 121.

At block 512, the steering module 290 directs the second of the beam steering devices 125 to steer the sample beam 120 at a second unscanned region (identified in FIG. 6 as 'A2') on the surface of the object 408.

At block 514, the distance module 294 adjusts the optical delay line 115 or the focal-length adjusting mechanism 123, or both, to keep the second region of the surface in focus and keep the reference path and sample path approximately equal in length within the tolerance of the coherence length.

At block 516, the system 100 performs an A-scan of the object 408.

At block 518, the multiplexing module 292 directs the multiport selector 130 to direct the sample beam 120 to a third of the beam steering devices 125 associated with a third of the scanner heads 121.

At block 520, the steering module 290 directs the third of the beam steering devices 125 to steer the sample beam 120 at a third unscanned region (identified in FIG. 6 as 'A3') on the surface of the object 408.

At block 522, the distance module 294 adjusts the optical delay line 115 or the focal-length adjusting mechanism 123, or both, to keep the third region of the surface in focus and keep the reference path and sample path approximately equal in length within the tolerance of the coherence length.

At block 524, the system 100 performs an A-scan of the object 408.

The system 100 consecutively repeats taking A-scans with the first one of the scanner heads 121, then with the second one of the scanner heads 121, and then with the third one of the scanner heads 121 at successive unscanned regions on the surface of the object 408. Whereby prior to each A-scan, the multiplexing module 292 directs the multiport selector 130 to direct the sample beam 120 to the respective one of the scanner heads 121, the steering module 290 directs the respective one of the beam steering devices 125 to steer the sample beam 120 at a respective region of the object 408, and the optical delay line 115 or the focal-length adjusting mechanism 123 are adjusted as necessary.

In some cases, the optical delay line 115 or the focal-length adjusting mechanism 123, or both, may not be required to be adjusted at all, or not adjusted during certain iterations, when the respective region is in focus and the difference between the reference path 114 and sample path 120 are within the coherence length. In further cases, the object 408 can have a curved or modulating surface which will require associated adjustments in the focal length in order to keep the surface in focus.

In some cases of the above embodiments, prior to adjustment of the optical delay line 115 or the focal-length adjusting mechanism 123, the distance module 294 can use the distance determination module 127 to measure a working distance between the scanner head 121 and the respective region on the surface of the object 408. In further cases, the distance module 294 can determine distance by, for example, retrieving the surface geometry of the object 408 from the database 288 or from the input interface 268. As an example, the surface geometry can be derived from a CAD model of the object 408. Upon processing the object's surface geometry, the working distance can be determined. In further cases, the distance module 294 can use a combination of distance measurement and predetermined geometry to determine the working distance.

In further embodiments, the system 100 can have more than three scanner heads 121 which are sequentially used to take A-scans at successive unscanned regions of the object 308, as exemplified in the above embodiments.

In further embodiments, the regions of the surface can be divided to be scanned between the various scanner heads 121 in any suitable manner; as an example, the first one of the scanner heads 121 used to perform A-scans on two consecutive regions of the surface, then the second one of the scanner heads 121 used to perform A-scans on two consecutive regions of the surface, and so on.

In further embodiments, each region can have an A-scan performed on it more than once via the same, or different, scanner head 121.

In further embodiments, unlike the examples of FIGS. 4 and 6, the unscanned regions of the object 408 can be spaced apart from one another and can be scanned by the system 100 non-sequentially. In further embodiments, a scanner head 121 receiving the sample beam 120 can be used to rescan a region of the object 408 previously scanned.

In the above embodiments, it is generally understood that the surface of the object 408 being in focus includes approximately the totality of the A-scan axial depth being in focus.

In some cases, the system 100 can perform up to approximately 1.5 million A-scans per second.

While in the present embodiments the object is described as 'moving' via the object translator 109, it is appreciated that moving can include successively moving and stopping the object 108 for scanning or continuously moving the object. Additionally, while in the present embodiments, the movement is shown along a single dimensional axis, it is appreciated that the movement of the object can be along a two-dimensional plane.

In some cases, after the A-scans, B-scans, and/or C-scans have been determined, the system can detect whether there are defects in the object using image interpretation and machine learning techniques. The defective label indicates that an unacceptable defect has been detected, and in some cases, such defect is of a particular type. In the example where the object is a vehicle part, the defect may have different shapes and dimensions. As an example, the defect may be an unwanted round seed or crater, or the like, on or under the surface of the part. As another example, the defect may have an elongated shape, such as with an unwanted fiber, or the like, on or under the surface of the part. As an example, the acceptable/defective label may be with regards to the size, area, or volume of a defect. In another example, acceptable/defective label may be with regards to the presence of defect between different layers of films applied in an industrial process; for example, in an automotive setting, in an electro-deposition (ED) layer, a colour layer, or a clear layer, where each layer is in the order of tens of microns thick.

In some cases, based on analysis of the OCT images, the system 100 can provide further information in the form of feature localization on the object. As an example, the information may be that there is fiber defect at location x=3.4 cm, y=5.6 cm on a vehicle part. Feature localization can also be specified with respect to surface depth, along the z-axis. Depth localization can be particularly advantageous in certain applications; for example, when thin films are being applied to a vehicle part. In this case, for example, after a vehicle part is painted, paint inspection may be required on various layers including an electro-deposition layer, a colour layer, and a clear coat layer. Being able to detect and determine the presence of a defect between any two of these layers is particularly advantageous because it has implications on the amount of re-work that may be required to resolve the imperfection. It can also be advantageous for improvement to a manufacturing process by being able to determine what type of defect is located at what layer; for example, a faulty HVAC system in the manufacturing environment could be responsible for introducing defects between layers. In this regard, being able to localize defect origin to a portion of the manufacturing path is an advantage to reduce future defects and rework.

The machine-learning techniques described herein may be implemented by providing input data to a neural network, such as a feed-forward neural network, for generating at least one output. The neural network may have a plurality of processing nodes, including a multi-variable input layer having a plurality of input nodes, at least one hidden layer of nodes, and an output layer having at least one output node. During operation of a neural network, each of the nodes in the hidden layer applies a function and a weight to any input arriving at that node (from the input layer or from another layer of the hidden layer), and the node may provide an output to other nodes (of the hidden layer or to the output layer). The neural network may be configured to perform a regression analysis providing a continuous output, or a classification analysis to classify data. The neural networks may be trained using supervised or unsupervised learning techniques. According to a supervised learning technique, a training dataset is provided at the input layer in conjunction with a set of known output values at the output layer; for example, imaging data for which defect location and/or existence is known. During a training stage, the neural network may process the training dataset. It is intended that the neural network learn how to provide an output for new input data by generalizing the information it learns in the training stage from the training data. Training may be effected by backpropagating error to determine weights of the nodes of the hidden layers to minimize the error. The training dataset, and the other data described herein, can be stored in the database 288 or otherwise accessible to the computing module 200. Once trained, or optionally during training, test data can be provided to the neural network to provide an output. The neural network may thus cross-correlate inputs provided to the input layer in order to provide at least one output at the output layer. Preferably, the output provided by the neural network in each embodiment will be close to a desired output for a given input, such that the neural network satisfactorily processes the input data.

In some embodiments, the machine learning techniques can employ, at least in part, a long short-term memory (LSTM) machine learning approach. The LSTM neural network allows for quickly and efficiently performing group feature selections and classifications.

In some embodiments, the detection can be by employing, at least in part, a convolutional neural network (CNN) machine learning approach.

While certain machine-learning approaches are described, specifically LSTM and CNN, it is appreciated that, in some cases, other suitable machine learning approaches may be used where appropriate.

Figure 7A:
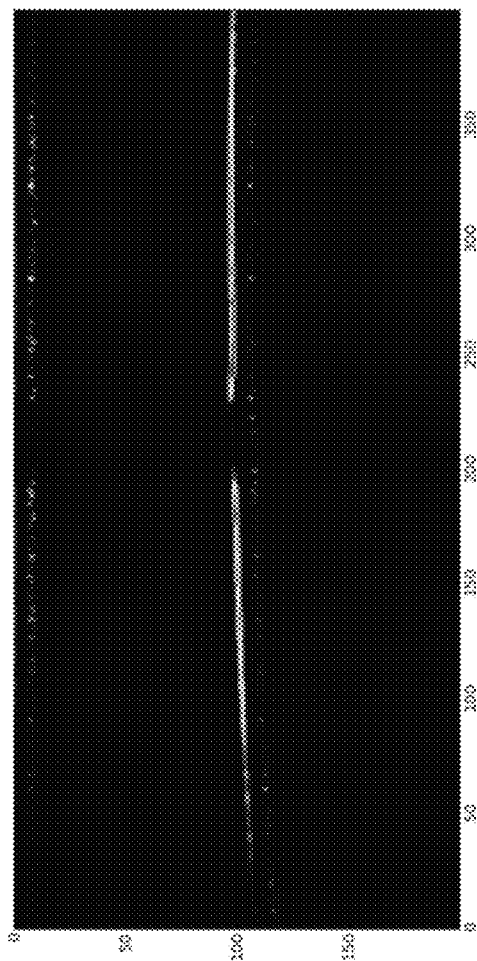
FIG. 7A is an exemplary B-scan in which a defect was detected in a paint layer of a vehicle part.
Figure 7B:
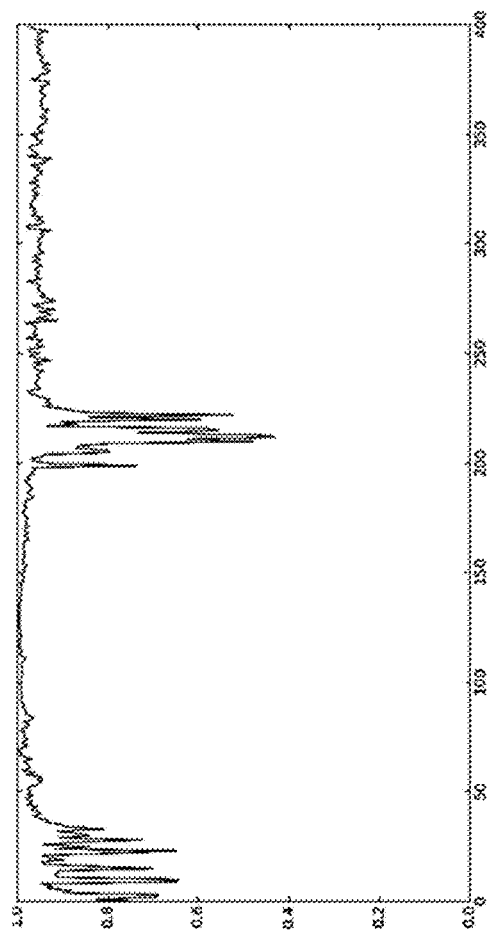
FIG. 7B is a plot of a score produced by for the exemplary B-scan of FIG. 7A.

As an example, FIG. 7A illustrates a B-scan in which a defect was detected in a paint layer of a vehicle part. As shown, the defect is centered at approximately $225 \times 10^{-2}$ mm along the fast scan axis (x-axis). Correspondingly, FIG. 7B illustrates a plot of a score produced by the CPU 260, between 0 and 1, representing a determined possibility that a defect is present in the exemplary B-scan of FIG. 7A.

Figure 8A:
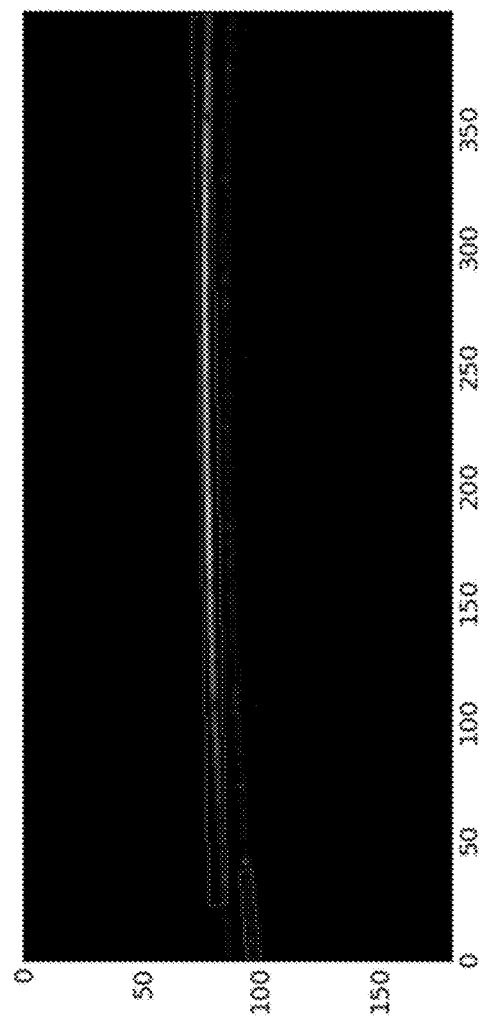
FIG. 8A is an exemplary B-scan, in which the system determined there are no features present.
Figure 8B:
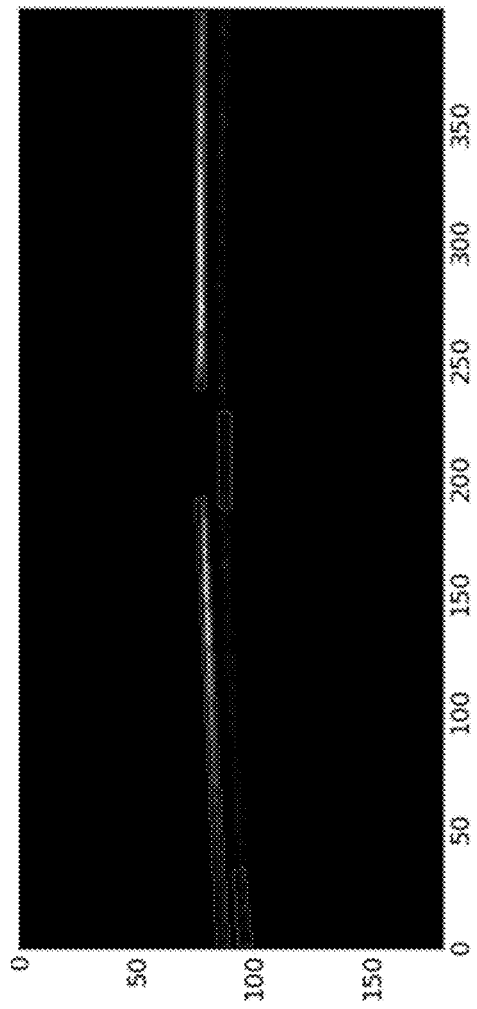
FIG. 8B is an exemplary B-scan, in which the system determined there are features present.

As an example, FIG. 8A illustrates a B-scan in which contours are outlined. In this case, the CPU 260 determined that there was no defect detected on the object. FIG. 8B also illustrates a B-scan in which contours are outlined. In this case, the CPU 260 determined that there was a defect detected on the object.

Figure 9:
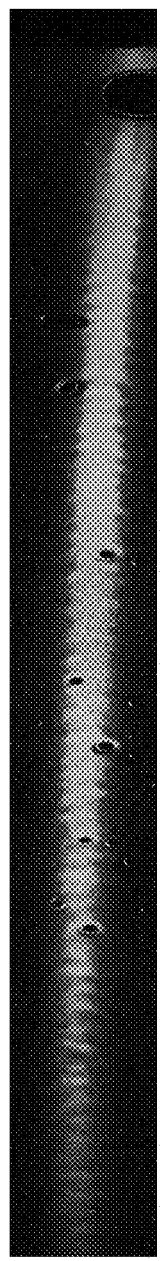
FIG. 9 is an exemplary image captured to form a top-level surface view of an object.

FIG. 9 illustrates an exemplary image captured to form a top-level surface view of an object.

Figures 10A, 10B:
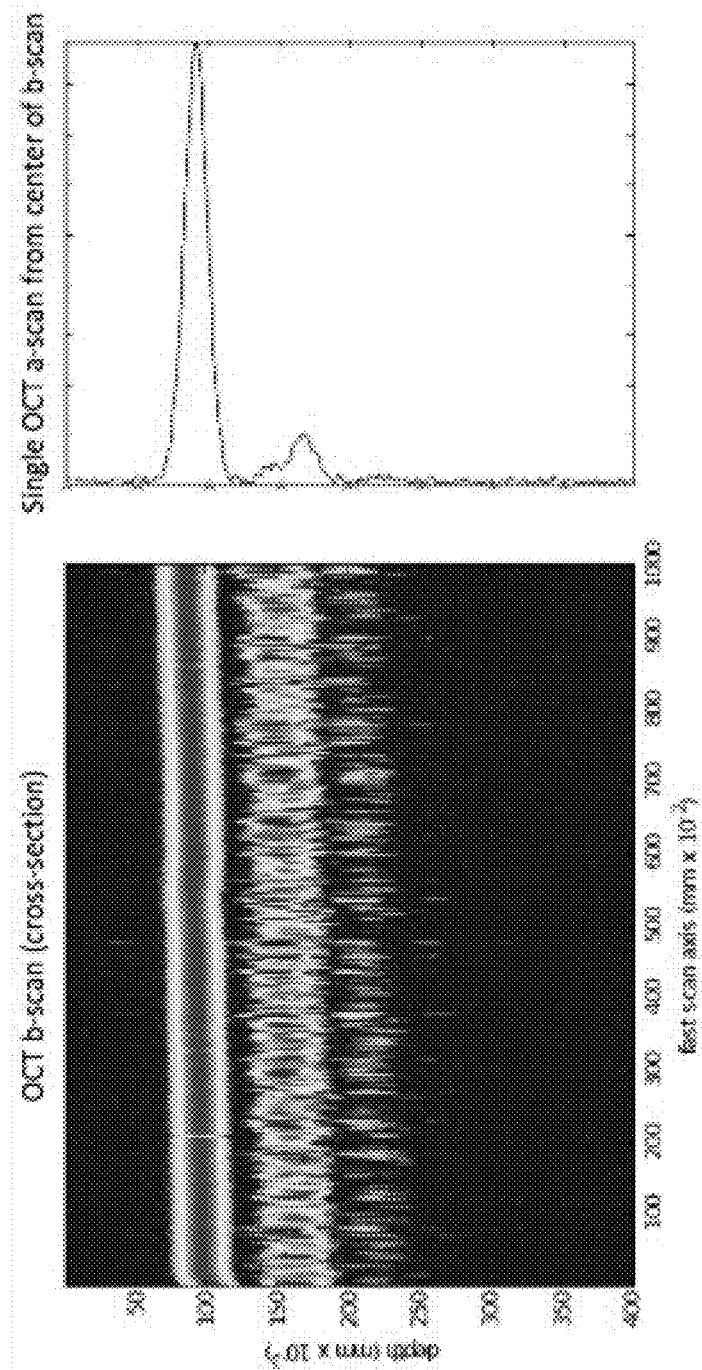
FIG. 10A is an exemplary B-scan of an object without problematic defects or features.
FIG. 10B is an exemplary A-scan of an object.

FIG. 10A illustrates an exemplary B-scan (cross-section) of an object without problematic defects or features (i.e., a 'clean' surface). FIG. 10B illustrates an exemplary A-scan from the center of the B-scan.

Figure 11:
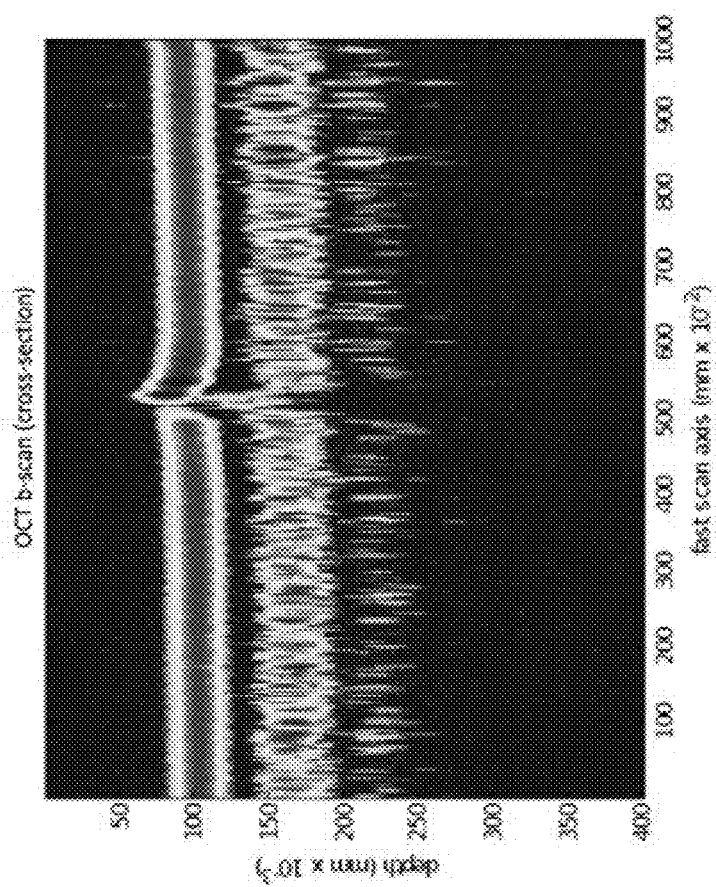
FIG. 11 is an exemplary B-scan of an object with problematic defects or features.

FIG. 11 illustrates an exemplary B-scan (cross-section) of an object with a problematic defects or feature present. In this case, as shown, there was a subsurface seed detected, centered at approximately 500 along the x-axis.

Figure 12:
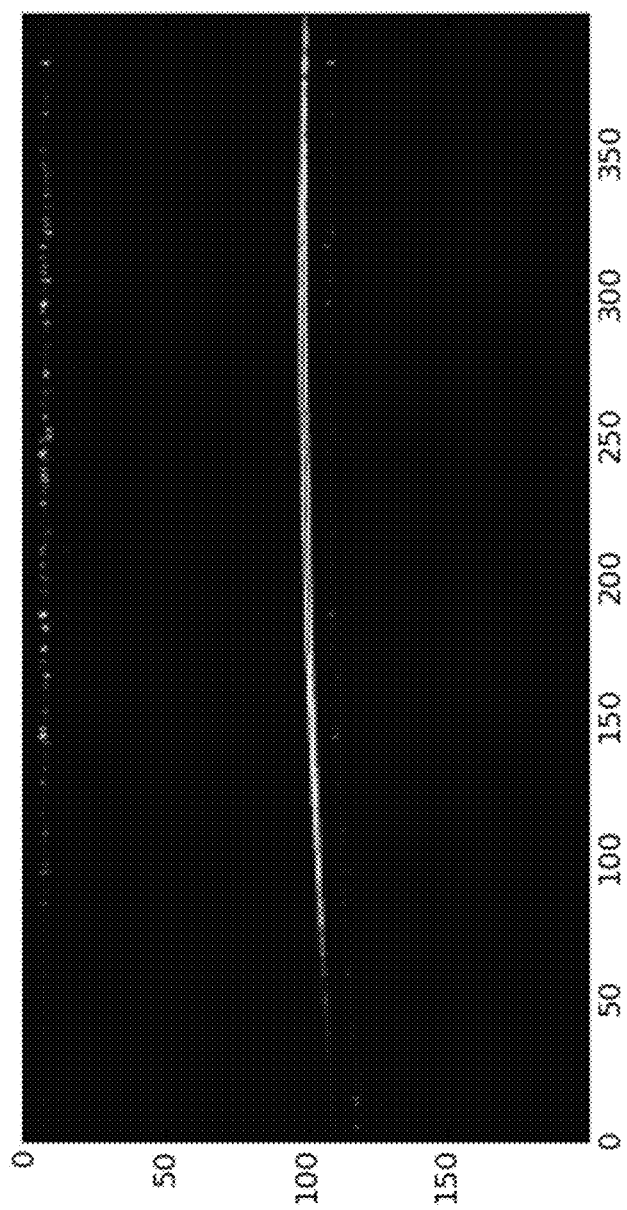
FIG. 12 is an exemplary B-scan of an object for determining whether there are defects.
Figure 13:
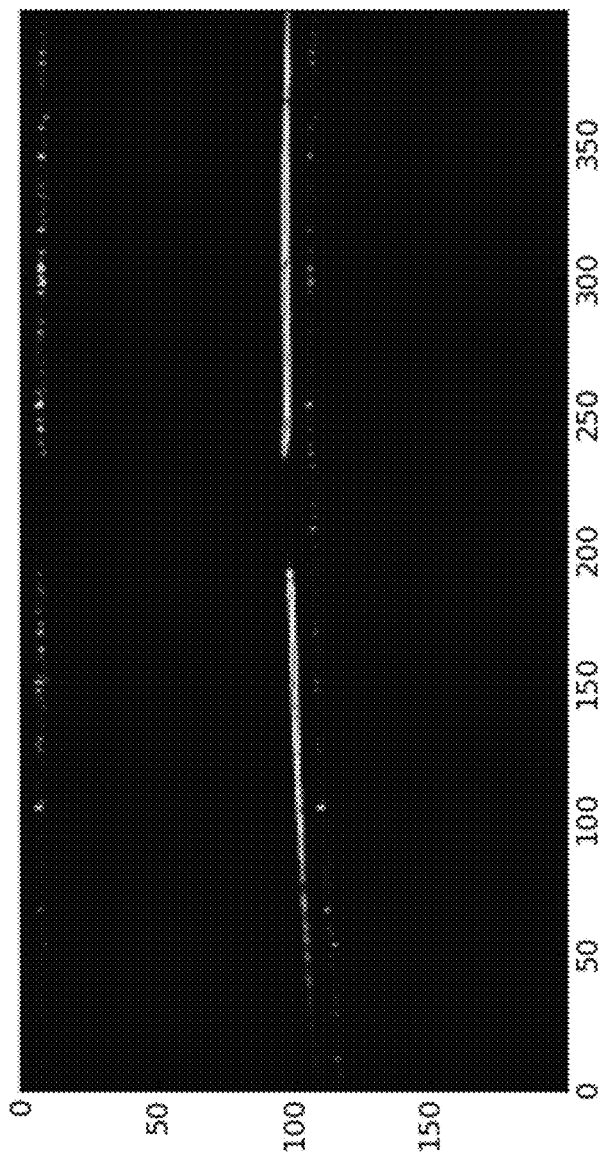
FIG. 13 is an exemplary B-scan of an object, showing a defect.

FIG. 12 illustrates an exemplary B-scan of a vehicle part for determining whether there are painting defects. In this case, there was no defect from the B-scan. FIG. 13 illustrates an exemplary B-scan of a vehicle part for determining whether there are painting defects. In this case, as shown, there was a defect in the paint layer detected, centered at approximately 225 along the x-axis.

Figure 14B:
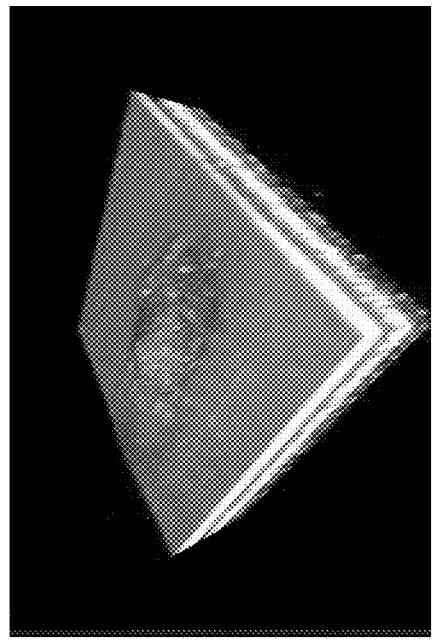
FIGS. 14A and 14B illustrate, at respectively different angles of perspective, an exemplary C-scan.
Figure 14A:
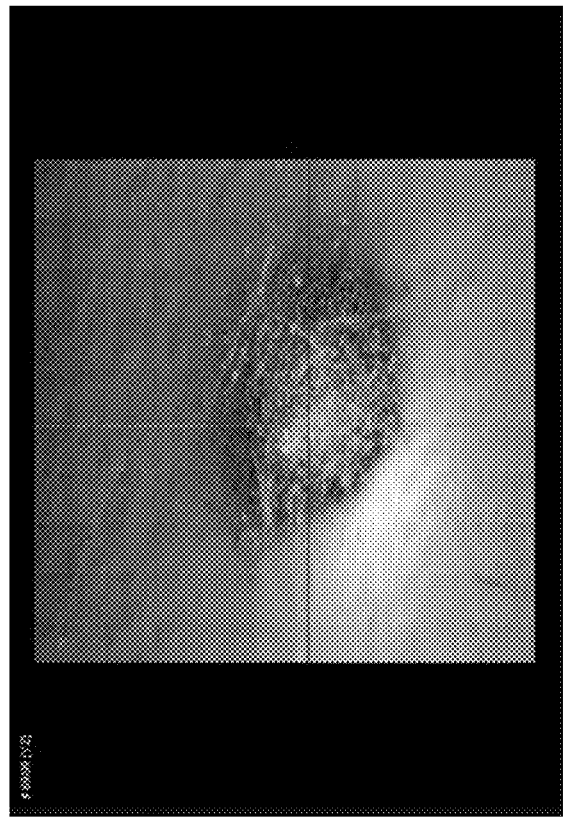

FIGS. 14A and 14B illustrate, at respectively different angles of perspective, an exemplary C-scan of a vehicle part. In this case, a seed was detected as a defect in the painting of a vehicle part.

In further embodiments, machine learning can also be used by the CPU 260 to detect and compensate for data acquisition errors at the A-scan, B-scan and C-scan levels.

The embodiments described herein include various intended substantial advantages. As an example, there can be substantial cost and complexity savings by having multiple scanner heads share a reference path and an optical source. In another example, by using multiple scanner heads, a larger region of an object can be scanned over a shorter amount of time.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method of detecting defects in a surface of an object using multiplexed optical coherence tomography (OCT) and machine learning, the method comprising:
   imaging the object using a multiplexed OCT imaging technique, the imaging including:
      moving the object relative to two or more scanner heads along a direction of travel;
      alternatingly directing a sample beam to each of the two or more scanner heads;
      when the sample beam is directed at a first of the scanner heads, scanning comprising:
         steering the sample beam from the first of the scanner heads to an unscanned region on the surface of the object; and
         performing an A-scan of the object; and
      when the sample beam is directed at a subsequent one of the scanner heads, scanning comprising:
         steering the sample beam from the subsequent one of the scanner heads to an adjacent unscanned region adjacent to the most-recently scanned region along a direction opposite the direction of travel; and
         performing an A-scan of the object;
   forming an OCT image from the A-scans; and
   analyzing the OCT image to determine whether a defect is present in the surface of the object, the analyzing including:
      providing the OCT image to an input layer of a neural network trained to detect and classify defects in the OCT image, the neural network trained using imaging data for which defect location and defect existence is known;
      determining whether a defect is present in the OCT image using the neural network, the determining including generating a defect classification for each detected defect at an output layer of the neural network; and
      for each detected defect, determining via a processor a feature localization for the detected defect.

2. The method of claim 1, wherein the sample beam is steered at a first unscanned region or an unscanned region adjacent to a most-recently scanned region along a direction opposite the direction of travel.

3. The method of claim 1, wherein, when the sample beam is directed at each respective scanner head, the scanning further comprising:
   determining whether the surface of the unscanned region is in focus; and
   where the surface of the unscanned region is not in focus, adjusting an optical path in the OCT such that the surface of the unscanned region is in focus.

4. The method of claim 3, wherein determining whether the surface of the unscanned region is in focus comprises measuring a distance between the respective scanner head and the surface of the object at the unscanned region to determine whether the surface is within a focal length of the OCT with the respective scanner head.

5. The method of claim 3, further comprising retrieving a surface geometry of the object, wherein determining whether the surface of the unscanned region is in focus comprises determining whether the surface is within a focal length of the OCT with the respective scanner head using the surface geometry of the object to determine a distance between the respective scanner head and the surface.

6. The method of claim 1, wherein, when the sample beam is directed at each respective scanner head, the scanning further comprising:
   determining whether a difference between a reference path of the OCT and a sample path of the OCT at the unscanned region are within a coherence length; and
   where the difference is not within the coherence length, adjusting an optical path in the OCT such that the difference is within the coherence length.

7. The method of claim 1, wherein successively scanned regions are nonadjacent.

* * * * *